(No Model.)

R. D. WIRT.
HOSE REEL.

No. 358,953.   Patented Mar. 8, 1887.

WITNESSES

INVENTOR

Attorneys

UNITED STATES PATENT OFFICE.

REUBEN D. WIRT, OF INDEPENDENCE, MISSOURI.

HOSE-REEL.

SPECIFICATION forming part of Letters Patent No. 358,953, dated March 8, 1887.

Application filed September 7, 1886. Serial No. 212,953. (No model.)

*To all whom it may concern:*

Be it known that I, REUBEN D. WIRT, of Independence, in the county of Jackson and State of Missouri, have invented certain new and useful Improvements in Hose-Reels; and I do hereby declare the following to be such a full, clear, and exact description of the invention as will enable others skilled in the art to which it appertains to make and use the same.

My invention relates to hose-reels; and the object of the invention is to provide a reel which shall be simple in its construction, cheap and easy to manufacture, one that will be strong and durable, and which may be readily rolled upon the ground to unreel the hose.

The invention consists in the details of construction and combinations of parts, hereinafter fully described, and pointed out in the claim.

Figure 1:
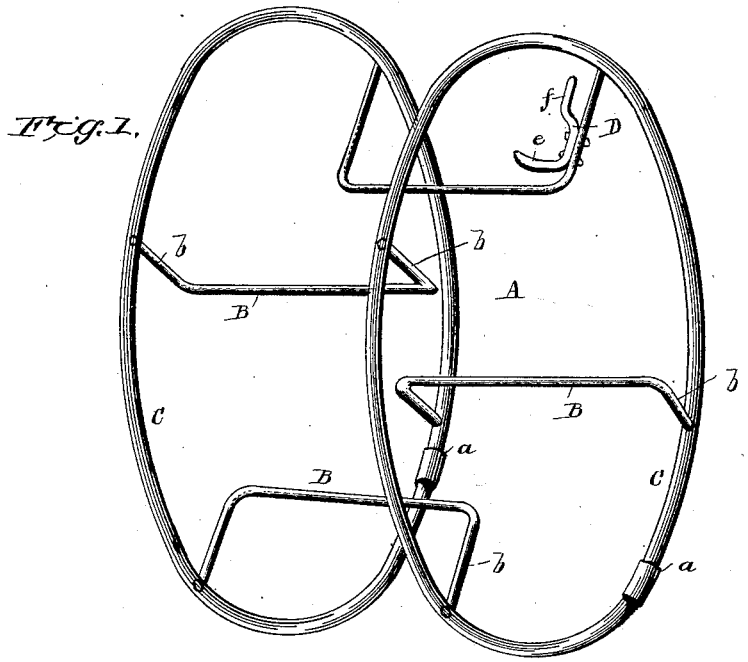
Figure 2:
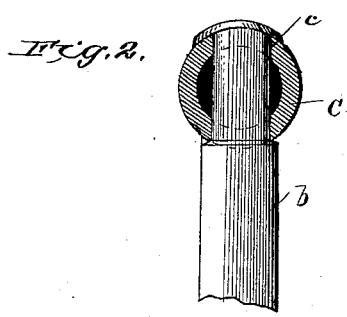

In the drawings, Figure 1 is a perspective view of a hose-reel embodying my invention. Fig. 2 is a detail view illustrating the manner of securing the angular arms to the circular sections.

Corresponding parts in both the figures are denoted by the same letters of reference.

Referring to the drawings, A represents the reel, which is composed of two circular sections connected by angular arms B. The circular sections C of the reel are each composed of a single piece of pipe—such as gas-pipe—bent into circular form, and connected at their ends by welding coupling collars or sleeves $a$. The angular arms B are each of a single piece of small pipe or rod, and are bent to form a straight body portion having the upwardly-extending ends $b$, which ends pass through openings $c$ in the sections C, and are then formed with shoulder and heads to prevent their detachment. On the inner face of one of the upwardly-extending ends of one of the angular arms is secured a bracket, D, to receive the ends of the hose. This bracket is of a single piece of metal, and is bent to form two receiving portions, $e f$, and is riveted or otherwise secured to the angular arm at a point between said portions $e f$.

It will be seen that by constructing the reel of the pipe-sections that it may be readily and quickly manufactured and at a trifling expense. In addition to this it is extremely strong and durable.

Another point of advantage for my reel is found in the fact that it may be easily rolled to unreel the hose, since its side sections which rest on the ground are cylindrical in cross section.

Having thus described my invention, what I claim is—

A hose-reel consisting of two pipe-sections, C, coupled at their ends, as at $a$, and having openings $c$, angular arms, each consisting of a straight body portion having upturned ends having shoulders, said ends passing through the openings in sections C and headed, and a bracket secured to one of the angular arms.

In testimony whereof I have signed this specification in the presence of two subscribing witnesses.

REUBEN D. WIRT.

Witnesses:
SAML. T. PLATT,
J. S. HARRISON.